United States Patent
Conklin

(10) Patent No.: US 6,405,190 B1
(45) Date of Patent: Jun. 11, 2002

(54) FREE FORMAT QUERY PROCESSING IN AN INFORMATION SEARCH AND RETRIEVAL SYSTEM

(75) Inventor: James Conklin, Scotts Valley, CA (US)

(73) Assignee: Oracle Corporation, Redwood Shores, CA (US)

( * ) Notice: Subject to any disclaimer, the term of this patent is extended or adjusted under 35 U.S.C. 154(b) by 0 days.

(21) Appl. No.: 09/270,450

(22) Filed: Mar. 16, 1999

(51) Int. Cl.[7] .............................................. G06F 17/30
(52) U.S. Cl. ................... 707/3; 707/5; 707/10; 706/52; 345/356
(58) Field of Search .................. 707/3, 5, 10, 531, 707/60; 706/45, 52; 704/9; 345/356

(56) References Cited

U.S. PATENT DOCUMENTS

| | | | |
|---|---|---|---|
| 4,649,515 A | * 3/1987 | Thompon et al. | 706/52 |
| 5,119,318 A | * 6/1992 | Paradies et al. | 706/52 |
| 5,239,663 A | * 8/1993 | Faudemay et al. | 707/3 |
| 5,504,887 A | * 4/1996 | Malhotra et al. | 707/205 |
| 5,619,709 A | * 4/1997 | Caid et al. | 707/532 |
| 5,657,450 A | * 8/1997 | Rao et al. | 707/10 |
| 5,659,724 A | * 8/1997 | Borgida et al. | 707/3 |
| 5,806,060 A | * 9/1998 | Borgida et al. | 707/3 |
| 5,870,740 A | * 2/1999 | Rose et al. | 707/5 |
| 6,023,695 A | * 2/2000 | Osborn et al. | 707/3 |
| 6,038,560 A | * 3/2000 | Wical | 707/5 |
| 6,094,652 A | * 7/2000 | Faisal | 707/5 |
| 6,101,515 A | * 8/2000 | Wical et al. | 707/531 |
| 6,112,168 A | * 8/2000 | Corston et al. | 704/9 |
| 6,144,953 A | * 11/2000 | Sorrells et al. | 706/60 |
| 6,154,213 A | * 11/2000 | Rennison et al. | 345/356 |

\* cited by examiner

*Primary Examiner*—Charles L. Rones
(74) *Attorney, Agent, or Firm*—Stattler Johansen & Adeli LLP

(57) ABSTRACT

A search and retrieval system pre-processes an input query to map a contextual semantic interpretation, expressed by the user of the input query, to a boolean logic interpretation for processing in the search and retrieval system. A knowledge base comprises a plurality of categories, such that subsets of the categories are designated to one of a plurality of groups. A lexicon stores a plurality of terms including definitional characteristics for the terms. To pre-process the query, the search and retrieval system receives an input query comprising a plurality of terms, and processes the terms by referencing the lexicon to identify value terms that comprise a content carrying capacity. The knowledge base is referenced to identify a group for each value term. A processed input query is generated by inserting an AND logical connector between two value terms if the two respective value terms are in different groups and by inserting an OR logical connector between two value terms if the two respective value terms are in the same group. The lexicon is also used to identify phrases as well as connective terms for conversion to a boolean operator.

17 Claims, 5 Drawing Sheets

FREE FORMAT QUERY PROCESSING IN AN INFORMATION SEARCH AND RETRIEVAL SYSTEM

BACKGROUND OF THE INVENTION

1. Field of the Invention

The present invention is directed toward the field of information search and retrieval systems, and more particularly to processing a free format query to determine conjunctives between terms of the free format search query.

2. Art Background

An information retrieval system attempts to match user queries (i.e., the users statement of information needs) to locate information available to the system. In general, the effectiveness of information retrieval systems may be evaluated in terms of many different criteria including execution efficiency, storage efficiency, retrieval effectiveness, etc. The most common measures used are "recall" and "precision." Recall is defined as the ratio of relevant documents retrieved for a given query over the number of relevant documents for that query available in the repository of information. Precision is defined as the ratio of the number of relevant documents retrieved over the total number of documents retrieved. Both recall and precision are measured with values ranging between zero and one. An ideal information retrieval system has both recall and precision values equal to one.

A user, in order to locate information in the system, specifies the type of information sought in the form of a query. The query consists of one or more terms that the user believes best expresses the information sought. For example, if a user seeks information regarding "the outbreak of Hepatitis in North America", the user may formulate the query "Hepatitis and North America." Typically, a formal query language requires the user to express the idea regarding the information sought within rigid parameters. A formal query language, such as the standard query language (SQL), sets forth parameters and format requirements for the query. For example, typically, information retrieval systems use Boolean operators to specify the connections between two or more words in the query. If the user inputs the query "Hepatitis and North America" and the word "and" is interpreted as a Boolean AND operation, then the information retrieval system retrieves all documents that contain subject matter on both Hepatitis and North America. Using a formal query language permits a one-to-one correspondence between the user's expression of the query and the interpretation of the query by the information retrieval system. Although formal query languages reduce the ambiguity between the user's expression and the interpretation by the system, they are rigid and require the user to learn the semantics of the query language. Accordingly, it is desirable to permit a user of an information retrieval system to submit a query in any form.

Generally, a query that expresses an idea to retrieve information that is not in a specific query language format is known as a free format query. Free format queries are also known as natural language queries. Free format queries contain an expression in a form of general human discourse. The user intends the query to be interpreted through a contextual semantic interpretation in the same way words are interpreted in general human discourse. For example, in a free format query, the user may formulate the query "Hepatitis in North America" to locate documents including subject matter on both Hepatitis and North America. In normal human discourse, although the word "and" was not used, it is apparent that the user seeks information on subject matter containing both Hepatitis AND North America. Even when "and conjunctions" and "or conjunctions" are used, humans do not use them in the same way as programming languages. For example, the user may express, as a free format query, the expression "red and green balls." This query example introduces an ambiguity as to whether the user seeks information regarding "red balls and green balls" or whether the user seeks information on balls that are both red and green. As is explained fully below, the present invention provides a link to bridge the gap between a contextual semantic interpretation of a free format query and a computer programming language interpretation of a formal query language.

SUMMARY OF THE INVENTION

A search and retrieval system pre-processes an input query to map a contextual semantic interpretation, expressed by the user of the input query, to a boolean logic interpretation for processing in the search and retrieval system. The search and retrieval system includes a knowledge base that comprises a plurality of categories. Subsets of the categories are designated to one of a plurality of groups. In one embodiment, the groups are based on dimensional categories, such that each dimensional category represents a discrete and independent concept from other dimensional categories in the knowledge base.

To pre-process the query, the search and retrieval system receives an input query comprising a plurality of terns, and processes the terms of the input query to identify value terms that comprise a content carrying capacity. The knowledge base is referenced to identify a group for each value term. A processed input query is generated by inserting an AND logical connector between two value terms if the two respective value terms are in different groups and by inserting an OR logical connector between two value terms if the two respective value terms are in the same group.

In one embodiment, the search and retrieval system includes a lexicon. The lexicon stores a plurality of terms and phrases, including information about the terms. During input query pre-processing, the lexicon is referenced to identify query terms as one of the phrases stored. If found, the phrase is processed as a single value term. In another embodiment, the user input query is processed to replace, where appropriate, prepositions and conjunctions. For this embodiment, the lexicon also identifies terms as AND preposition terms, AND conjunction terms, OR conjunction terms, and NOT conjunction terms. During query pre-processing, the lexicon is referenced to identify an input query term as an AND preposition term, an AND conjunction term, or an OR conjunction term. An AND logical boolean connector is generated in lieu of the input query term if an input query term comprises an AND preposition term, and an OR logical boolean connector is generated in lieu of the input query term if an input query term comprises an OR conjunction term. An AND logical boolean connector is generated in lieu of the input query term if an input query term comprises an AND conjunction term, and a NOT logical boolean connector is generated in lieu of the input query term if an input query term comprises a NOT conjunction term.

DETAILED DESCRIPTION

Figure 1:
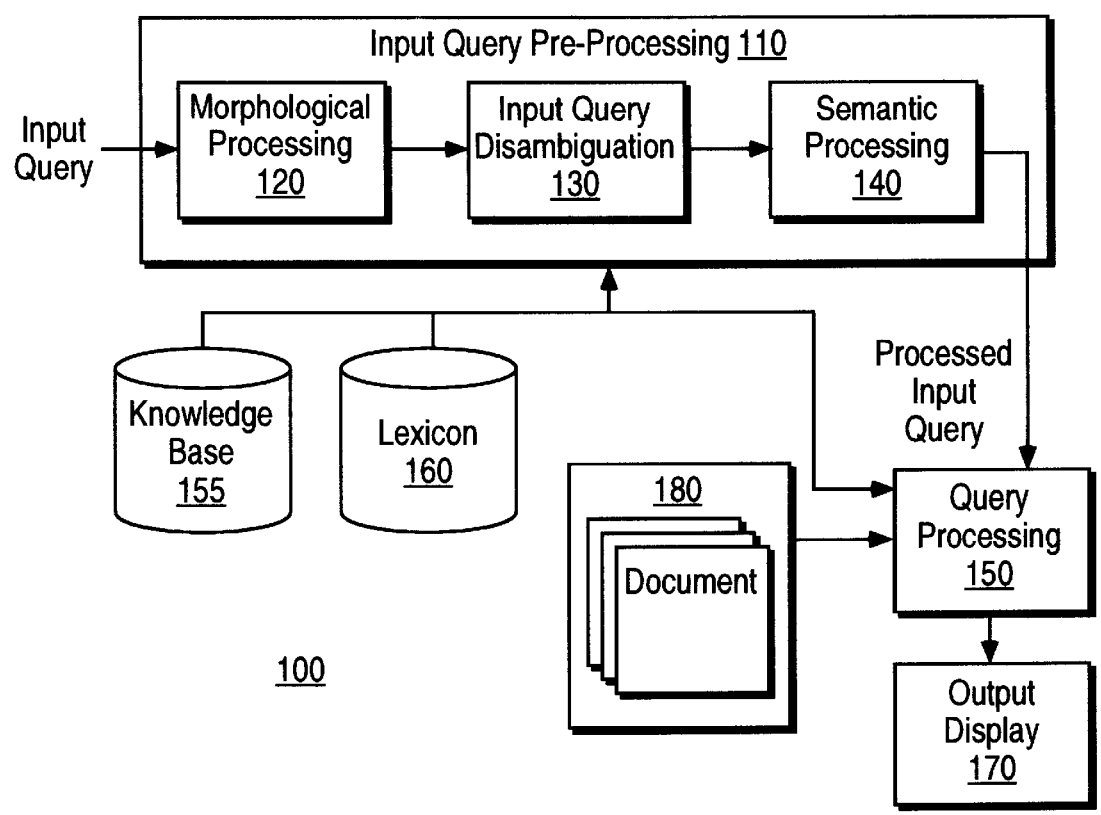
FIG. 1 is a block diagram illustrating one embodiment for the information retrieval system of the present invention.

FIG. 1 is a block diagram illustrating one embodiment for the information retrieval system of the present invention. An information retrieval system 100 receives, as input, an input query, and generates, as output, a response to the query displayed on an output display 170. The input query includes multiple words expressed as a free format query. A user of information retrieval system 100 may input any type of text string to locate information. For this embodiment, information retrieval system 100 includes input query pre-processing 110. In general, input query pre-processing 110 transforms the input query to a processed input query, so as to bridge the gap between the users contextual semantic interpretation of the input query and the information retrieval system's programming language (e.g., the information retrieval system's Boolean logic interpretation). More specifically, input query pre-processing 110 transforms, as appropriate, the connectors between the words of the input query to generate the processed input query.

For this embodiment, input query pre-processing 110 contains morphological processing 120, input query disambiguation 130, and semantic processing 140. Also, input query pre-processing 110 utilizes a knowledge base 155 and a lexicon 160. In general, morphological processing 120 performs linguistic analysis on the input query to identify phrases and identify the content carrying words of the input query (i.e., referred to herein as the value terms). The input query disambiguation 130 analyzes the query processed by morphological processing 120, and replaces any words in the query to link the semantic interpretation of the user to a programming language interpretation of the information retrieval system. In general, semantic processing 140 analyzes the query processed by the input query disambiguation 130, and add connective terms to the query to also bridge the semantic interpretation of the query intended by the user to a programming language interpretation of the information retrieval system. Specifically, semantic processing 140 determines semantic distances or conceptual proximity among the value terms in the query. For this embodiment, semantic processing 140 utilizes the knowledge base 155. The knowledge base 155 provides information on how terminology relates to other terminology. The semantic processing 140 maps the value terms to categories in the knowledge base 155 to determine if they are related. Generally, if a term or group of terms are related, semantic processing 140 inserts/interprets connectors between the like terms as a Boolean OR operation. Alternatively, if a term or group of terms are unrelated to each other, then semantic processing 140 inserts/interprets a connector between these terms or groups as a Boolean AND operation. Accordingly, semantic processing 140 maps the input query from the human contextual semantic interpretation to a programming language interpretation (e.g., Boolean logic interpretation).

Free format queries are not always well formed. To compensate, in addition to identifying the proper logical operators, semantic processing 140 also determines the correct grouping of value terms in a query. The following example query "sinks, tubs, Georgia, faucets, Florida, and parasitic infections", may be re-grouped in the processed input query as "(sinks OR tubs OR faucets) AND (Georgia OR Florida) AND (parasitic_infections)."

Input query preprocessing 110 utilizes lexicon 160. In general, lexicon 160, stored on a computer readable medium, comprises words, as well as information about those words. In one embodiment, lexicon 160 includes definitional characteristics for each word. One definitional characteristic defines the part of speech for the corresponding word. For example, the lexicon 160 identifies whether a word is a common noun. Lexicon 160 also identifies the amount of content carrying information for a corresponding word. As described more fully below with a description of input query disambiguation 130, the lexicon 160 also stores definitional characteristics to determine whether to convert certain connector words to Boolean logic connectors. One embodiment for a lexicon is described in U.S. Pat. No. 5,694,523, issued to Kelly Wical on Dec. 2, 1997, in Appendix A, wherein U.S. Pat. No. 5,694,523 is expressly incorporated herein by reference.

As shown in FIG. 1, the processed input query (i. e., free form query translated into a Boolean logic interpretation) is input to query processing 150. In general, query processing 150 analyzes the processed input query to generate a response to the user's input query. In one embodiment, this response includes identifying one or more documents from a corpus of documents 180 that are relevant to the input query. Query processing 150 outputs the results to output display 170, a human readable display. Any algorithm that locates relevant information may be used in query processing 150. In fact, query processing 150, corpus of documents 180 and output display 170 are intended to represent a broad category of search and retrieval systems, which are well known in the art.

The information retrieval system 100 utilizes a knowledge base, labeled 155 on FIG. 1. In general, the knowledge base 155 includes a plurality of nodes that comprise concepts and categories, expressed as terminology, and is augmented to include associations among the concepts and categories. In one embodiment, the knowledge base 155 may contain classification and contextual information based on processing and/or compilation of thousands of documents or may contain information based on manual selection by a linguist. The contents, generation and use of the knowledge base 155 is described more fully below in the section entitled "The Knowledge Base."

The knowledge base 155 contains a hierarchical organization of categories and cross-references. Since categories of an ontology are related hierarchically, it is not valid to use all categories of an ontology as independent dimensions. However, since the categories are related ontologically (i.e., independent trees), the knowledge base 155 contains a "horizontal line" through the tree structure to define an appropriate level of dimensionality. Specifically, the hierarchically arranged categories of the knowledge base 155 are broken down into several dimensions by defining certain categories as "dimensional categories." These dimensional categories are treated as independent dimensions, and are used in semantic processing 140 to determine whether two terms have a linguistic, semantic, or usage association.

In one embodiment, to determine which categories of the knowledge base 155 are dimensional categories, the following criteria is used. No dimensional category may be the ancestor of another (i.e., one dimensional category cannot be a child, grandchild, great grandchild, etc. of another dimensional category). Each dimensional category specifies a particular field of study, industry or easily understood topic. Also, each dimensional category is chosen to be as close to the top of the tree structure as possible while still being specific enough to identify a field of study, industry or easily understood topic.

The following list sets forth dimensional categories in accordance with one embodiment for the knowledge base 155. Although the following list sets forth one embodiment for implementing dimensional categories for the input query pre-processing 110, any set of categories may be used without deviating from the spirit or scope of the invention.

Figure 2:
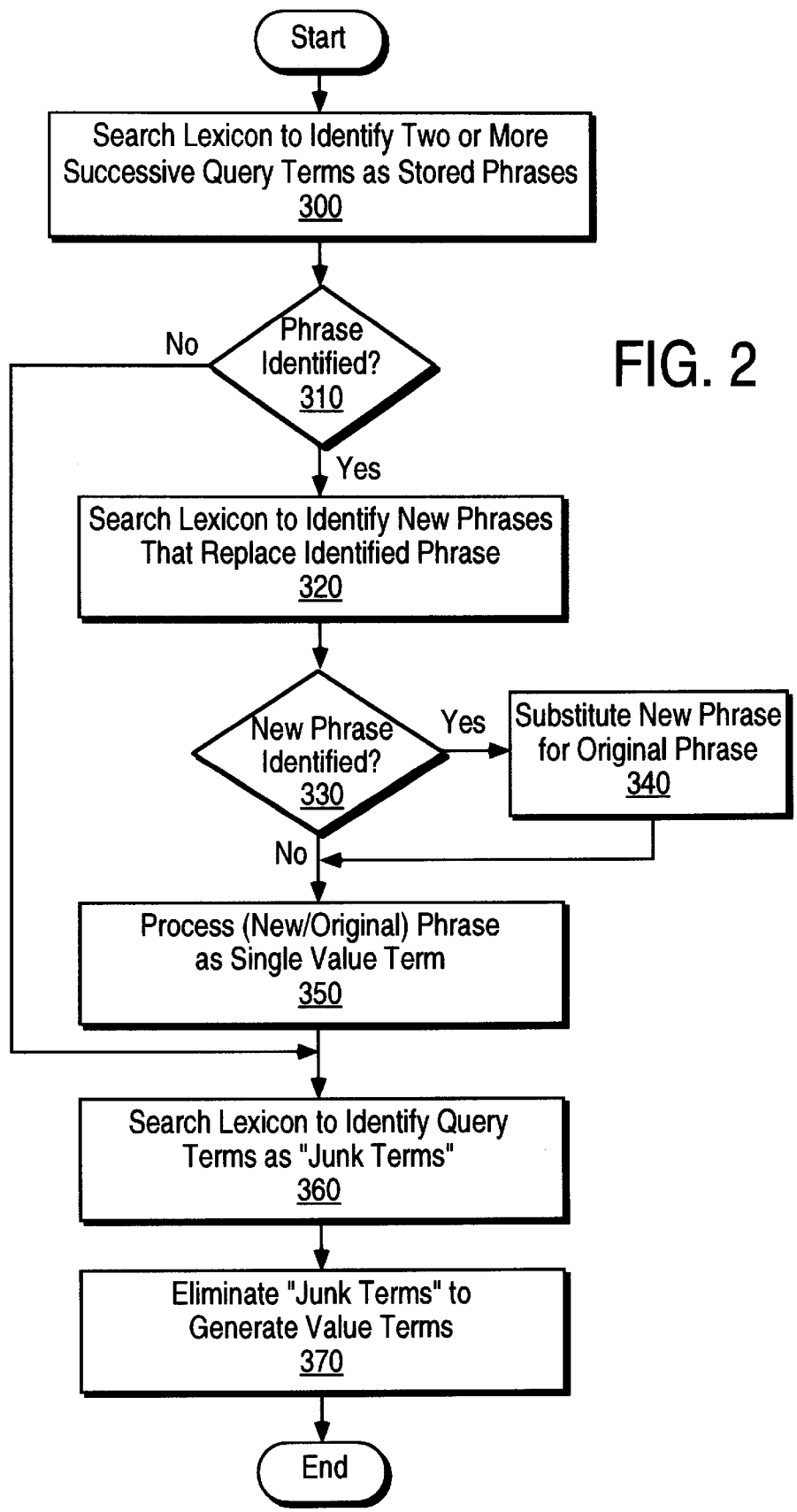
FIG. 2 is a flow diagram illustrating one embodiment for morphological processing.

FIG. 2 is a flow diagram illustrating one embodiment for morphological processing 120 (FIG. 1). Morphological processing 120 attempts to find phrases in the knowledge base 155 that correspond to terms in the input query. The lexicon 160 is searched to identify two or more successive query terms as stored phrases (block 300). For example, the lexicon 160 stores the phrase "New_England" as a phrase. For this example, if the input query contains the words "New" and "England" in succession, then both words or the phrase is processed as a single value term (block 350). If a phrase is identified, then the lexicon 160 is searched to identify new phrases, typically in a reduced form, that replace the identified phrase (blocks 310 and 320). If a new reduced phrase is found, then the new phrase is substituted for the original phrase (blocks 330 and 340).

| List | | |
|---|---|---|
| business services industry | commerce and trade | corporate business |
| economics | financial institutions | financial investments |
| financial lending | industrial business | labor and unions |
| public sector industry | taxes and tariffs | cartography |
| bodies of water | land forms | Africa |
| Antarctica | Arctic | Asia |
| Atlantic area | Caribbean | Central America |
| Europe | Indian Ocean area | Mediterranean |
| Middle East | North America | Pacific area |
| South America | acts, powers and procedures | county government |
| forms and philosophies of government | government bodies and institutions | government officials |
| government programs | international relations | law |
| municipal government | politics | postal communications |
| public facilities | state government | military |
| journalism | publishing industry | speech communications |
| telecommunications industry | formal education | aerospace industry |
| chemical industry | chemistry | civil engineering |
| computer industry | electronics | energy industry |
| environment control industries | explosives and firearms | geology |
| inventions | biology | biotechnology |
| health and medicine | mathematics | mechanical engineering |
| physics | textiles | tools and hardware |
| anthropology | archeology | history |
| human sexuality | linguistics | psychology |
| sociology | aviation | freight and shipping |
| ground transportation | marine transportation | travel industry |
| folklore | mythology | paranormal phenomena |
| philosophy | religion | clothing |
| cosmetics | fashion industry | grooming |
| jewelry | emergency services | family |
| food and agriculture | housekeeping and butlery | housewares |
| hobbies | cartoons, comic books, and superheroes | cinema |
| entertainments and spectacles | humor and satire | literature |
| performing arts | science fiction | television and radio |
| visual arts | crafts | games |
| gaming industry | gardening | outdoor recreation |
| pets | restaurant industry | smoking and tobacco |
| sports | toys | activity, action |
| change, states of change | time | communication, exchange of ideas |
| feeling, sensation | gender | mental faculties, intellect |
| social attitude, custom | states of mind, attitude | will, volition |
| ability, power | authority, power | possession, ownership |
| possibility, feasibility | purpose, use | support, aid |
| agreement, correspondence | cause, effect | difference |
| paradigms | relevance, pertinence | sameness, similarity |
| uniformity, homogeneity | variety | existence, presence |
| form, substance | quality, condition | quantity, amount |
| range, scope | | |

Morphological processing 120 also utilizes the lexicon 160 to eliminate "junk terms." In general, junk terms or noise words are those words in the input query that have little or no content carrying value. In one embodiment, the lexicon 160 stores, for each junk term, a special flag denoted "QUERY_NOISE." For this embodiment, the lexicon 160 is searched to identify query terms as junk terms or noise words (block 360, FIG. 2). If junk terms are identified, then the junk terms are eliminated to produce a query with value terms (block 370, FIG. 2). Table 1 below sets forth an example list of junk or noise words.

TABLE 1 could you
i want
i would like
please
we want
we would like
would you
display
draw up
give
give me
let me see
let us see
list
make
make up
output
prepare
present The words contained in Table 1 are only examples of junk terms, and one of ordinary skill in the art of linguistics will recognize additional junk or noise terms.

When a new phrase is specified, the documents in the corpus of documents 180 require conversion to include the new phrase. Typically, new phrases are generated to reduce the form of an old phrase. The reduced form for the phrase is chosen such that it matches the reduced form generated from the form of the new phrase that a user inputs as part of the input query.

Figure 3:
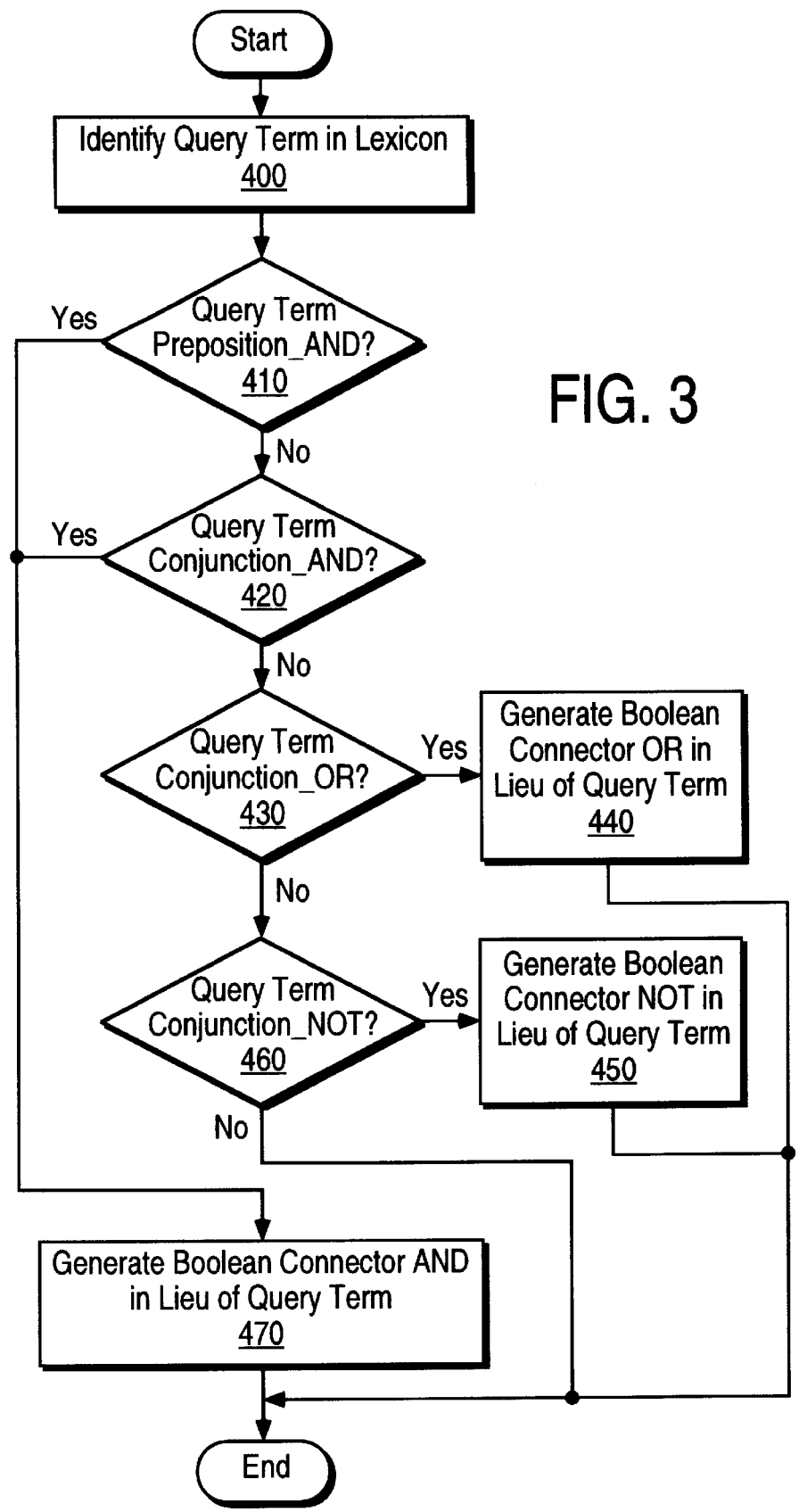
FIG. 3 is a flow diagram illustrating one embodiment for input query disambiguation.

FIG. 3 is a flow diagram illustrating one embodiment for input query disambiguation 130 (FIG. 1). There are a number of connective types of words found in a free format query. In one embodiment, to identify connective types for conversion, input query disambiguation 130 utilizes the lexicon 160. As shown in FIG. 3, a query term is identified in the lexicon 160 (block 400). For this embodiment, the lexicon 160 stores a plurality of flags that indicate a particular part of speech is to be converted to a particular Boolean operator. One flag, designated "QUERY_PREP_AND", indicates that the corresponding word, a preposition, is to be translated into a Boolean AND. Table 2 lists a few prepositions that carry the QUERY_PREP_AND flag in the lexicon 160.

TABLE 2 with
in
on
for
about

Input query disambiguation 130 determines whether the term in the input query includes the lexicon flag QUERY_PREP_AND (block 410, FIG. 3). If the term has the QUERY_PREP_AND flag, then a Boolean connector AND is generated in lieu of the query term (block 470).

For this embodiment, the lexicon 160 includes a flag entitled "QUERY_CONJ_AND." The "QUERY_CONJ_AND" flag indicates, for certain conjunctions in the lexicon 160, the need to translate a conjunction to an AND Boolean operator. If the query term includes the QUERY_CONJ_AND, then the Boolean operator AND is generated in lieu of the query term (blocks 420 and 470, FIG. 3). Table 3 contains some examples of conjunctions with the QUERY_CONJ_AND flag.

TABLE 3 along with
also
and
and also
in addition to

For example, the input query "bears along with Alaska", is translated into "bears AND Alaska."

A flag "QUERY_CONJ_OR", specifies the need to translate of the corresponding word into an OR Boolean operator. If the input query word includes QUERY_CONJ_OR, then a Boolean OR connector is generated in lieu of the query term (blocks 430 and 440, FIG. 3). Table 4 lists some examples of words that include the QUERY_CONJ_OR flag in lexicon 160.

TABLE 4 either
either one of
or
any
any one of

For example, an input query that states "either one of Montana, Alaska", is translated into "Montana OR Alaska."

A word in lexicon 160, which is a negation conjunction, may include the flag "QUERY_NOT." When the "QUERY_NOT" flag is present, the word of the input query is replaced with the Boolean operator NOT (blocks 460 and 450). Table 5 lists some examples of negation conjunctions that include the flag "QUERY_NOT."

TABLE 5 besides
all but
but not
except
except for
no
not

For this example, an input query of "bears but not Montana", translates to "bears NOT Montana."

Figure 4:
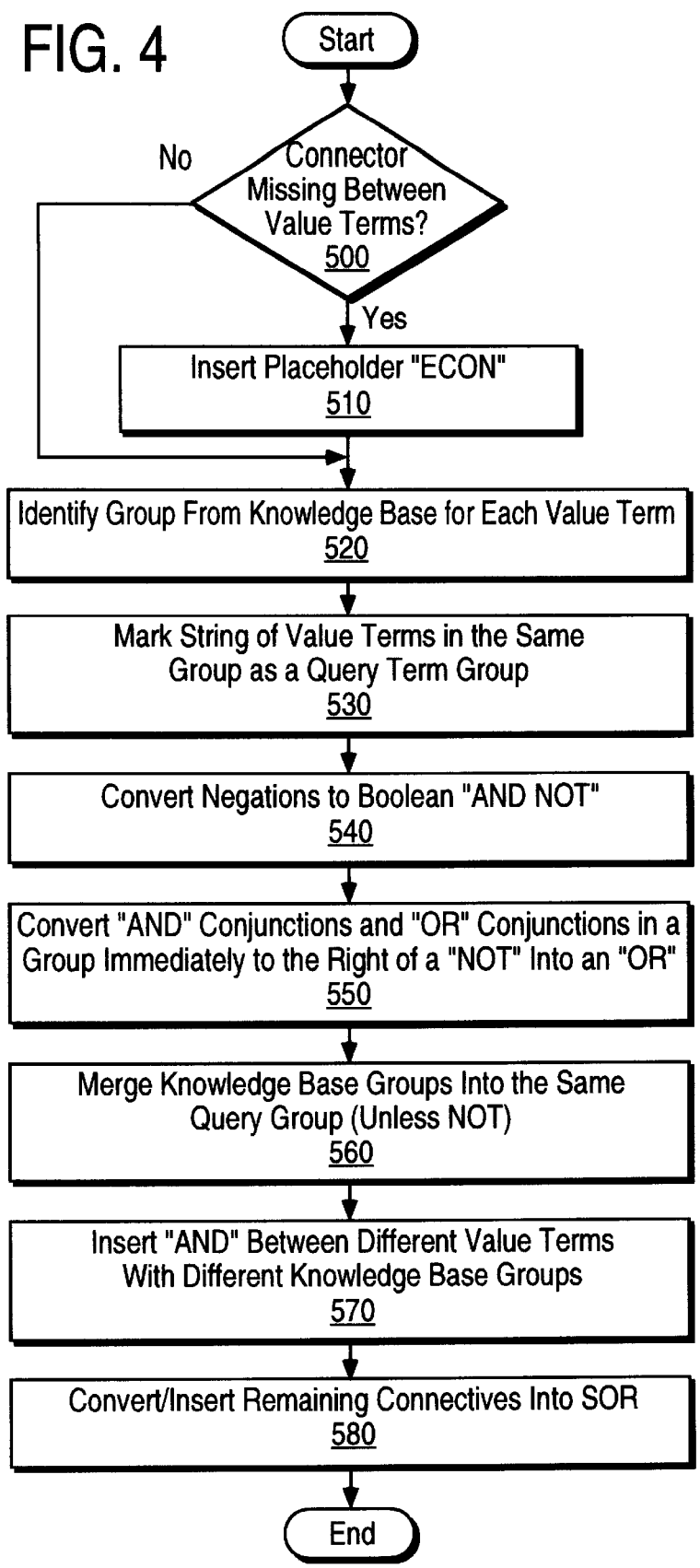
FIG. 4 is a flow diagram illustrating one embodiment for semantic processing.

FIG. 4 is a flow diagram illustrating one embodiment for semantic processing 140 (FIG. 1). In general, semantic processing 140 translates a contextual semantic interpretation of the input query to a Boolman logic interpretation. The Boolean operators include: AND, OR, SOR, and NOT. For the embodiment shown in FIG. 4, if a connector is missing between two value terms, then a placeholder, entitled "ECON", is inserted (blocks 500 and 510, FIG. 4). An input query "camping hiking and skiing in Maine no canoeing or swimming", is translated to "camping ECON hiking and skiing in Maine no canoeing or swimming."

A group number, derived from a dimensional category in the knowledge base 155, is identified for each value term (block 520, FIG. 4). For the above example query "camping ECON hiking and skiing in Maine no canoeing or swimming" becomes the query in Table 6.

TABLE 6

| 2 | 2 | 2 | | 7 | 2 | | 2 |
|---|---|---|---|---|---|---|---|
| camping | ECON | hildng | and skiing | in Maine | no canoeing | or | swimming |

In one embodiment, to derive the group number, the value term of the input query is mapped to a corresponding category in the knowledge base 155. This category is then traced up its respective ontological tree to identify the corresponding dimensional category. A group number that corresponds to the dimensional category is extracted. For the example shown in Table 6, the value terms "camping", "hiking", "skiing", "canoeing" and "swimming" all trace to the dimensional category of group 2. The geographical term, Maine, traces to a dimensional category with a group number 7.

A string of value terms in the same dimensional category group is marked as a query term group (block 530, FIG. 4). The example query of Table 6 becomes:

| 2 | 2 | 2 | | 7 | 2 | | 2 |
|---|---|---|---|---|---|---|---|
| (camping | ECON | hiking | and skiing) | in Maine | no (canoeing | or | swimming) |

The value terms "camping, hiking and skiing" were marked as a first query group as indicated by the parenthesis encompassing those value terms. Similarly, the value terms "canoeing or swimming" are also placed in a query group.

Negations are converted to the Boolean operator AND NOT (block 540, FIG. 4). The example input query becomes:

| 2 | 2 | 2 | | 7 | 2 | | 2 |
|---|---|---|---|---|---|---|---|
| (camping | ECON | hiking | and skiing) | in Maine | AND NOT (canoeing | or | swimming) |

The "no" negation was translated to the Boolean Operator AND NOT.

"And conjunctions" and "or conjunction" in a query term group immediately to the right of a NOT are converted to a boolean OR (block 550, FIG. 4). The above query is translated into:

The or connective between "canoeing" and "swimming" was converted to a Boolean OR.

Knowledge base groups (e.g., dimensional categories) are merged into the same query group (block 560); however, query terms that are part of a NOT group are not considered. In the following query "camping, hiking and skiing in Maine and Georgia also swimming" is rearranged so that the term "swimming" becomes part of the query group (camping, hiking, skiing and swimming). The terms "camping, hiking, skiing and swimming" are placed in the same query group because they have either a linguistic, semantic, or usage association as indicated by the group number derived from the knowledge base 155.

Prepositions flagged in the lexicon with the flag "QUERY_PREP_AND", are converted to the Boolean operator AND. (Blocks 410 and 470, FIG. 3). As an example, the query:

| 2 | 2 | 2 | | 7 | 2 | | 2 |
|---|---|---|---|---|---|---|---|
| (camping | ECON | hiking | and skiing) | in Maine | AND NOT (canoeing | OR | swimming) |

| 2 | | 2 | | 2 | | 7 | | 2 | | 2 |
|---|---|---|---|---|---|---|---|---|---|---|
| (camping | ECON | hiking | and | skiing) | in | Maine | AND NOT | (canoeing | or | swimming) | becomes

| 2 | | 2 | | 2 | | 7 | | 2 | | 2 |
|---|---|---|---|---|---|---|---|---|---|---|
| (camping | ECON | hiking | and | skiing) | AND | Maine | AND NOT | (canoeing | OR | swimming) |

The "in" preposition was converted to the Boolean operator AND.

Connectives that combine different value terms with different group numbers are converted into the Boolean operator AND (block 570, FIG. 4). For example, the query "camping Georgia ringworm" has the following associated group numbers:

| 2 | | 7 | | 30 |
|---|---|---|---|---|
| camping | ECON | Georgia | ECON | ringworm. |

Converting conjunctives that combine different value terms with different group numbers into the Boolean operator AND yields the query "camping AND Georgia AND ringworm."

The remaining conjunctives, including the placeholders, are converted to a STRONG or (SOR) (block 580, FIG. 4). The query

| 2 | | 2 | | 2 | | 7 | | 2 | | 2 |
|---|---|---|---|---|---|---|---|---|---|---|
| (camping | ECON | hiking | and | skiing) | AND | Maine | AND NOT | (canoeing | OR | swimming) | becomes

| 2 | | 2 | | 2 | | 7 | | 2 | | 2 |
|---|---|---|---|---|---|---|---|---|---|---|
| (camping | SOR | hiking | SOR | skiing) | AND | Maine | AND NOT | (canoeing | OR | swimming) |

The placeholder, ECON, was converted to the SOR operator, and the connective and between "hiking" and "skiing", was converted to SOR operator.

Knowledge Base:

In general, the knowledge base 155 is the repository for all knowledge about languages and about the concrete and abstract worlds described by language in human discourse. The knowledge base 155 contains two major types of data: language specific data necessary to describe a language used for human discourse, and language independent data necessary to describe the meaning of human discourse, In one embodiment, the knowledge base 155 consists of concepts, general categories, and cross-references. Concepts, or detailed categories, are a subset of the canonical forms determined by the language dependent data. These concepts themselves are language independent. In different languages their text representations may be different; however, these terms represent the universal ontological location. Concepts are typically thought of as identification numbers that have potentially different representations in different languages. These representations are the particular canonical forms in those languages. General categories are themselves concepts, and have canonical form representations in each language. These categories have the additional property that other concepts and general categories can be associated with them to create a knowledge hierarchy. Cross references are links between general categories. These links augment the ancestry links that are generated by the associations that form a directed graph.

The ontology in the knowledge base 155 contains only canonical nouns and noun phrases, and it is the normalization processing 120 that provides mappings from non-nouns and non-canonical nouns, The organization of the knowledge base 155 provides a world view of knowledge, and therefore the ontology actually contains only ideas of canonical nouns and noun phrases. The text representation of those ideas is different in each language, but the ontological location of the ideas in the knowledge base 155 remains the same for all languages, The organizational part of the knowledge base 155 is the structured category hierarchy comprised at the top level of general categories. These categories represent knowledge about how the world is organized. The hierarchy of general categories is a standard tree structure. In one embodiment, a depth limit of sixteen levels is maintained. The tree organization provides a comprehensive structure that permits augmentation of more detailed information. The tree structure results in a broad but shallow structure. The average depth from tree top to a leaf node is five, and the average number of children for non-leaf nodes is 4.5.

There are two types of general categories: concrete and abstract. This distinction is an organizational one only and it has no functional ramifications. A concrete category is one that represents a real-world industry, field of study, place, technology or physical entity. The following are examples of concrete categories: "chemistry", "computer industry", "social identities", "Alabama", and "Cinema." An abstract category is one that represents a relationship, quality, fielding or measure that does not have an obvious physical real-world manifestation. The following examples are abstract categories: "downward motion", "stability", "stupidity, foolishness, fools", "mediation, pacification", "texture", and "shortness."

Many language dependent canonical forms map to the language independent concepts stored as the knowledge base 155. The concept is any idea found in the real world that can be classified or categorized as being closely associated with one and only one knowledge base 155 general category. Similarly, any canonical form in a particular language can map to one and only one concept. For example, there is a universal concept for the birds called "cranes" in English, and a universal concept for the machines called "cranes" in English. However, the canonical form "cranes" does not map to either concept in English due to its ambiguity. In another language, which may have two different canonical forms for these concepts, mapping may not be a problem. Similarly, if "cranes" is an unambiguous canonical form in another language, then no ambiguity is presented in mapping.

Figure 5:
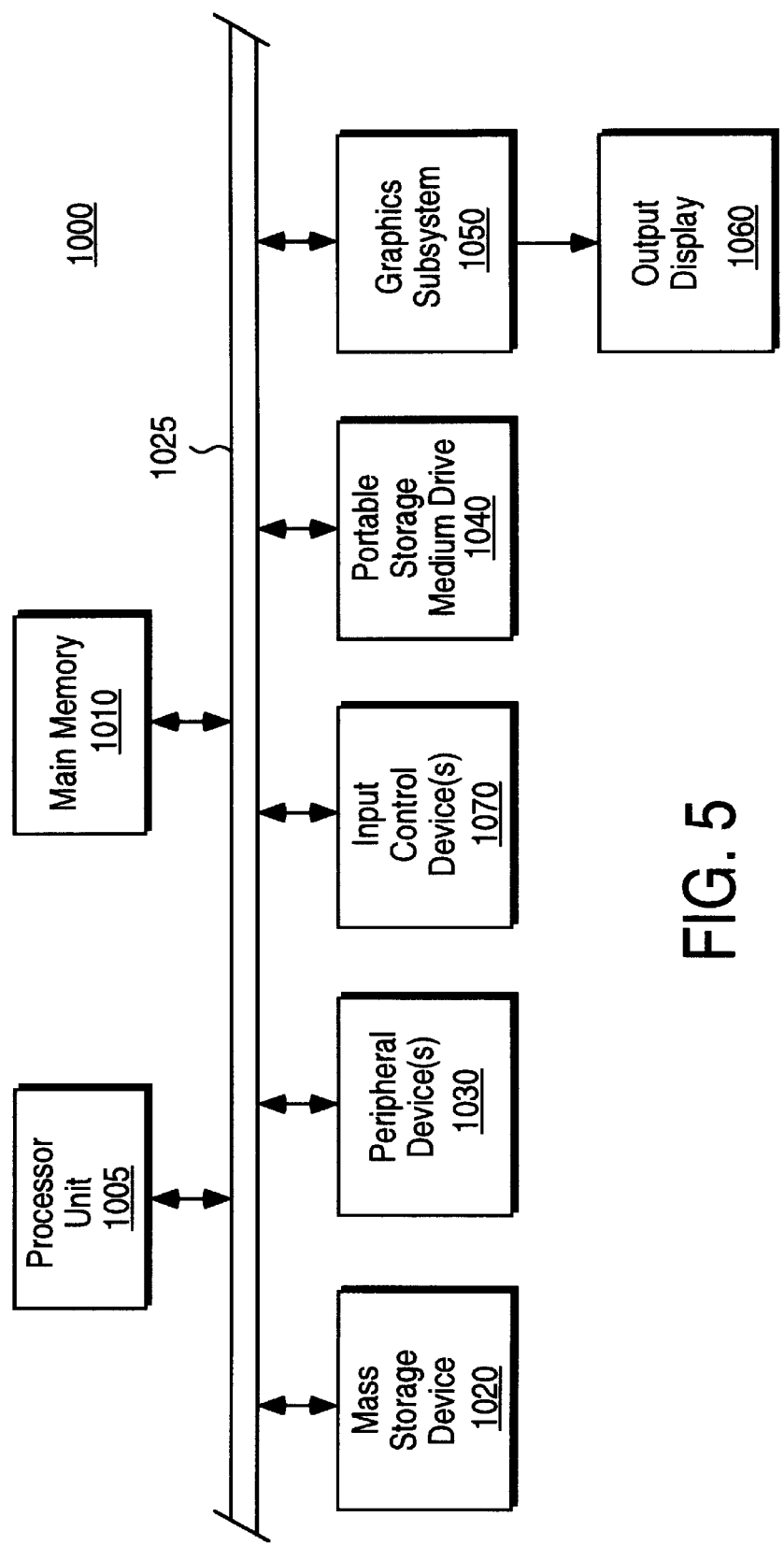
FIG. 5 illustrates a high level block diagram of a general purpose computer system in which the information search and retrieval system of the present invention may be implemented.

Computer System Implementation:

FIG. 5 illustrates a high level block diagram of a general purpose computer system in which the information search and retrieval system of the present invention may be implemented. A computer system 1000 contains a processor unit 1005, main memory 1010, and an interconnect bus 1025. The processor unit 1005 may contain a single microprocessor, or may contain a plurality of microprocessors for configuring the computer system 1000 as a multi-processor system. The main memory 1010 stores, in part, instructions and data for execution by the processor unit 1005. If the information search and retrieval system of the present invention is wholly or partially implemented in software, the main memory 1010 stores the executable code when in operation. The main memory 1010 may include banks of dynamic random access memory (DRAM) as well as high speed cache memory.

The computer system 1000 further includes a mass storage device 1020, peripheral device(s) 1030, portable storage medium drive(s) 1040, input control device(s) 1070, a graphics subsystem 1050, and an output display 1060. For purposes of simplicity, all components in the computer system 1000 are shown in FIG. 5 as being connected via the bus 1025. However, the computer system 1000 may be connected through one or more data transport means. For example, the processor unit 1005 and the main memory 1010 may be connected via a local microprocessor bus, and the mass storage device 1020, peripheral device(s) 1030, portable storage medium drive(s) 1040, graphics subsystem 1050 may be connected via one or more input/output (I/O) busses. The mass storage device 1020, which may be implemented with a magnetic disk drive or an optical disk drive, is a non-volatile storage device for storing data and instructions for use by the processor unit 1005. In the software embodiment, the mass storage device 1020 stores the information search and retrieval system software for loading to the main memory 1010.

The portable storage medium drive 1040 operates in conjunction with a portable non-volatile storage medium, such as a floppy disk or a compact disc read only memory (CD-ROM), to input and output data and code to and from the computer system 1000. In one embodiment, the information search and retrieval system software is stored on such a portable medium, and is input to the Computer system 1000 via the portable storage medium drive 1040. The peripheral device(s) 1030 may include any type of computer support device, such as an input/output (I/O) interface, to add additional functionality to the computer system 1000. For example, the peripheral device(s) 1030 may include a network interface card for interfacing the computer system 1000 to a network. For the software implementation, documents may be input to the computer system 1000 via a portable storage medium or a network for processing by the information search and retrieval system.

The input control device(s) 1070 provide a portion of the user interface for a user of the computer system 1000. The input control device(s) 1070 may include an alphanumeric keypad for inputting alphanumeric and other key information, a cursor control device, such as a mouse, a trackball, stylus 5 or cursor direction keys. The user query is input to the information search and retrieval system through an input control device. In order to display textual and graphical information, the computer system 1000 contains the graphics subsystem 1050 and the output display 1060. The output display 1060 may include a cathode ray tube (CRT) display or liquid crystal display (LCD). The graphics subsystem 1050 receives textual and graphical information, and processes the information for output to the output display 1060. The query response is displayed on the output display. The components contained in the computer system 1000 are those typically found in general purpose computer systems, and in fact, these components are intended to represent a broad category of such computer components that are well known in the art.

The query processing techniques may be implemented in either hardware or software. For the software implementation, the query pre-processing is software that includes a plurality of computer executable instructions for implementation on a general purpose computer system. Prior to loading into a general purpose computer system, the query pre-processing software may reside as encoded information on a computer readable medium, such as a magnetic floppy disk, magnetic tape, and compact disc read only memory (CD-ROM). In one hardware implementation, the query pre-processing may comprise a dedicated processor including processor instructions for performing the functions described herein. Circuits may also be developed to perform the functions described herein.

Although the present invention has been described in terms of specific exemplary embodiments, it will be appreciated that various modifications and alterations might be made by those skilled in the art without departing from the spirit and scope of the invention.

What is claimed is:

1. A method for processing terns of an input query, said method comprising the steps of:

receiving an input query comprising a plurality of terms;

storing a knowledge base comprising a plurality of categories, wherein a plurality of subsets of said categories are designated dimensional categories;

processing said terms of said input query to identify value terms that comprise content carrying capacity;

referencing said knowledge base to identify a dimensional category for each value term:

generating a processed input query comprising, as a logical connector between two value terms, an AND if two respective value terms are associated with two different dimensional categories, and generating an OR if two respective value terms are associated with the same dimensional category.

2. The method as set forth in claim 1, further comprising the steps of:

storing a plurality of phrases;

referencing said phrases to identify a plurality of successive input query terms as one of said phrases stored; and processing 5 aid phrase identified as a single value term.

3. The method as set forth in claim 1, wherein the step of processing said terms of said input query to identify value terms comprises the steps of:

storing a lexicon comprising a plurality of terms that identifies a part of speech for a respective term;

accessing said lexicon to reference each query input term; and selecting, as value terms, those terms that carry content.

4. The method as set forth in claim 1, further comprising the steps of:

storing a lexicon comprising a plurality of terms, wherein said lexicon identifies of a set of terms, designated as prepositions, as AND preposition terms;

referencing said lexicon to identify an input query term as an AND preposition term; and generating, in said processed input query, an AND logical boolean connector in lieu of said input query term if an input query term comprises an AND preposition term.

5. The method as set forth in claim 1, further comprising the steps of:

storing a lexicon comprising a plurality of terns, wherein said lexicon identifies of a set of tennis, designated as conjunctions, as AND conjunction terms;

referencing said lexicon to identify an input query term as an AND conjunction term; and generating, in said processed input query, an AND logical boolean connector in lieu of said input query term if an input query term comprises an AND conjunction term.

6. The method as set forth in claim 1, further comprising the steps of:

storing a lexicon comprising a pluxality of terms, wherein said lexicon identifies of a set of terms, designated as conjunctions, as OR conjunction terms;

referencing said lexicon to identify an input query term as an OR conjunction term; and generating, in said processed input query, an OR logical boolean connector in lieu of said input query term if an input query term comprises an OR conjunction term.

7. The method as set forth in claim 1, further comprising the steps of:

storing a lexicon comprising a plurality of terms, wherein said lexicon identifies of a set of terms, designated as conjunctions, as NOT conjunction terms;

referencing said lexicon to identify an input query term as a NOT conjunction term; and generating, in said processed input query, a NOT logical boolean connector in lieu of said input query term if an input query term comprises a NOT conjunction term.

8. The method as set forth in claim 1, wherein the step of storing a knowledge base comprising a plurality categories designated into groups comprises the step of storing a knowledge base wherein a subset of said categories comprises a plurality of dimensional categories, such that each dimensional category represents discrete and independent concepts from other dimensional categories and each dimensional category represents one of said groups.

9. A computer readable medium comprising a plurality of instructions which when executed causes the computer to perform the steps of:

receiving an input query comprising a plurality of terms;

storing a knowledge base comprising a plurality of categories, wherein a plurality of subsets of said categories are designated dimensional categories;

processing said terms of said input query to identify value terms that comprise content carrying capacity;

referencing said knowledge base to identify a dimensional category for each value term;

generating a processed input query comprising, as a logical connector between two value terms, an AND if two respective value terms are associated with two different dimensional categories, and generating an OR if two respective value terms are associated with the same dimensional category.

10. The computer readable medium as set forth in claim 9, further comprising the steps of:

storing a plurality of phrases;

referencing said phrases to identify a plurality of successive input query terms as one of said phrases stored; and processing said phrase identified as a single value term.

11. The computer readable medium as set forth in claim 9, wherein the step of processing said terms of said input query to identify value terms comprises the steps of:

storing a lexicon comprising a plurality of terms that identifies a part of speech for a respective term;

accessing said lexicon to reference each query input term; and selecting, as value terms, those terms that carry content.

12. The computer readable medium as set forth in claim 9, further comprising the steps of:

storing a lexicon comprising a plurality of terms, wherein said lexicon identifies of a set of terms, designated as prepositions, as AND preposition terms;

referencing said lexicon to identify an input query term as an AND preposition term; and generating, in said processed input query, an AND logical boolean connector in lieu of said input query term if an input query term comprises an AND preposition term.

13. The computer readable medium as set forth in claim 9, further comprising the steps of:

storing a lexicon comprising a plurality of terms, wherein said lexicon identifies of a set of terms, designated as conjunctions, as AND conjunction terms;

referencing said lexicon to identify an input query term as an AND conjunction term; and generating, in said processed input query, an AND logical boolean connector in lieu of said input query term if an input query term comprises an AND conjunction term.

14. The computer readable medium as set forth in claim 9, further comprising the steps of:

storing a lexicon comprising a plurality of terms, wherein said lexicon identifies of a set of terms, designated as conjunctions, as OR conjunction terms;

referencing said lexicon to identify an input query term as an OR conjunction term; and generating, in said processed input query, an OR logical boolean connector in lieu of said input query term if an input query term comprises an OR conjunction term.

15. The computer readable medium as set forth in claim 9, further comprising the steps of:

storing a lexicon comprising a plurality of terms, wherein said lexicon identifies of a set of terms, designated as conjunctions, as NOT conjunction terms;

referencing said lexicon to identify an input query term as a NOT conjunction term; and generating, in said processed input query, a NOT logical boolean connector in lieu of said input query term if an input query term comprises a NOT conjunction term.

16. The computer readable medium as set forth in claim 9, wherein the step of storing a knowledge base comprising a plurality categories designated into groups comprises the step of storing a knowledge base wherein a subset of said categories comprises a plurality of dimensional categories, such that each dimensional category represents discrete and independent concepts from other dimensional categories and each dimensional category represents one of said groups.

17. A computer system comprising:

a user input device for receiving an input query comprising a plurality of terms;

memory for storing a knowledge base comprising a plurality of categories, wherein a plurality of subsets of said categories are designated dimensional categories; and processor unit coupled to said memory and said user input device for processing said terms of said input query to identify value terms that comprise content carrying capacity, for referencing said knowledge base to identify a dimensional category for each value term, and for generating a processed input query comprising, as a logical connector between two value terms, an AND if two respective value terms are associated with two different dimensional categories, and generating an OR if two respective value terms are associated with the same dimensional category.

* * * * *